Dec. 29, 1931.　　　　L. D. SOUBIER　　　　1,838,161
GLASSWARE FORMING MACHINE
Filed Feb. 9, 1928　　　9 Sheets-Sheet 4
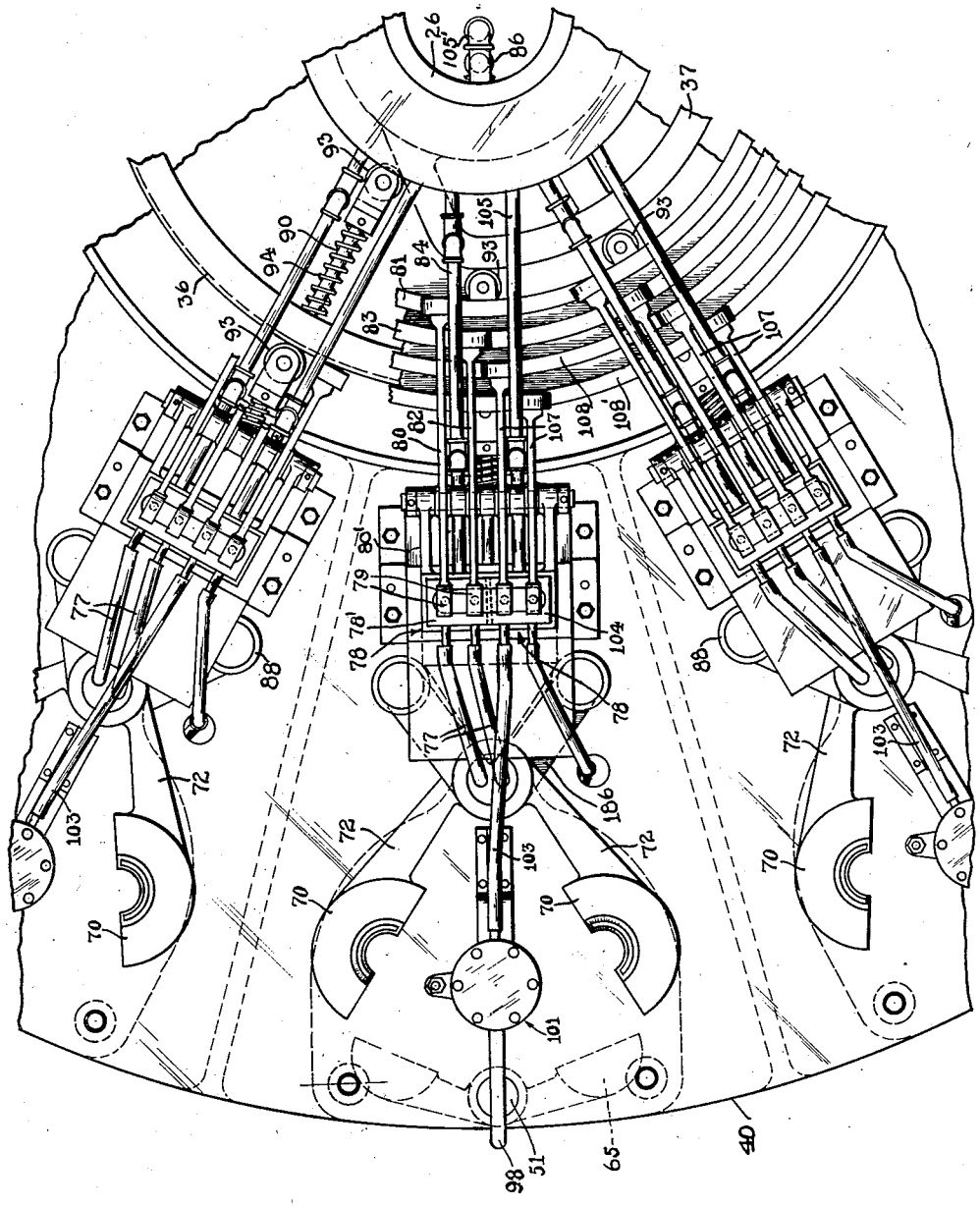
INVENTOR
Leonard D. Soubier
BY
J. F. Rule.
HIS ATTORNEY

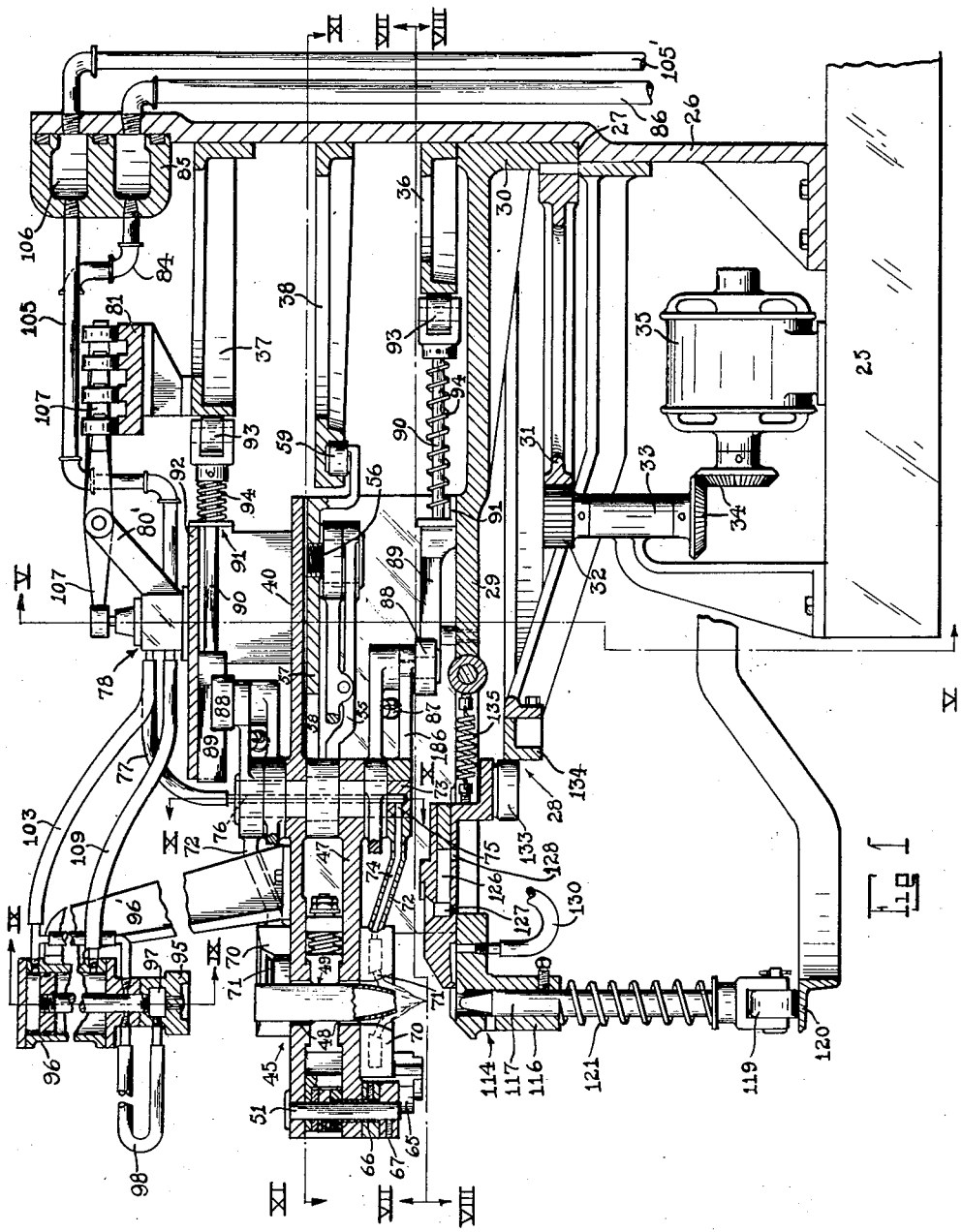

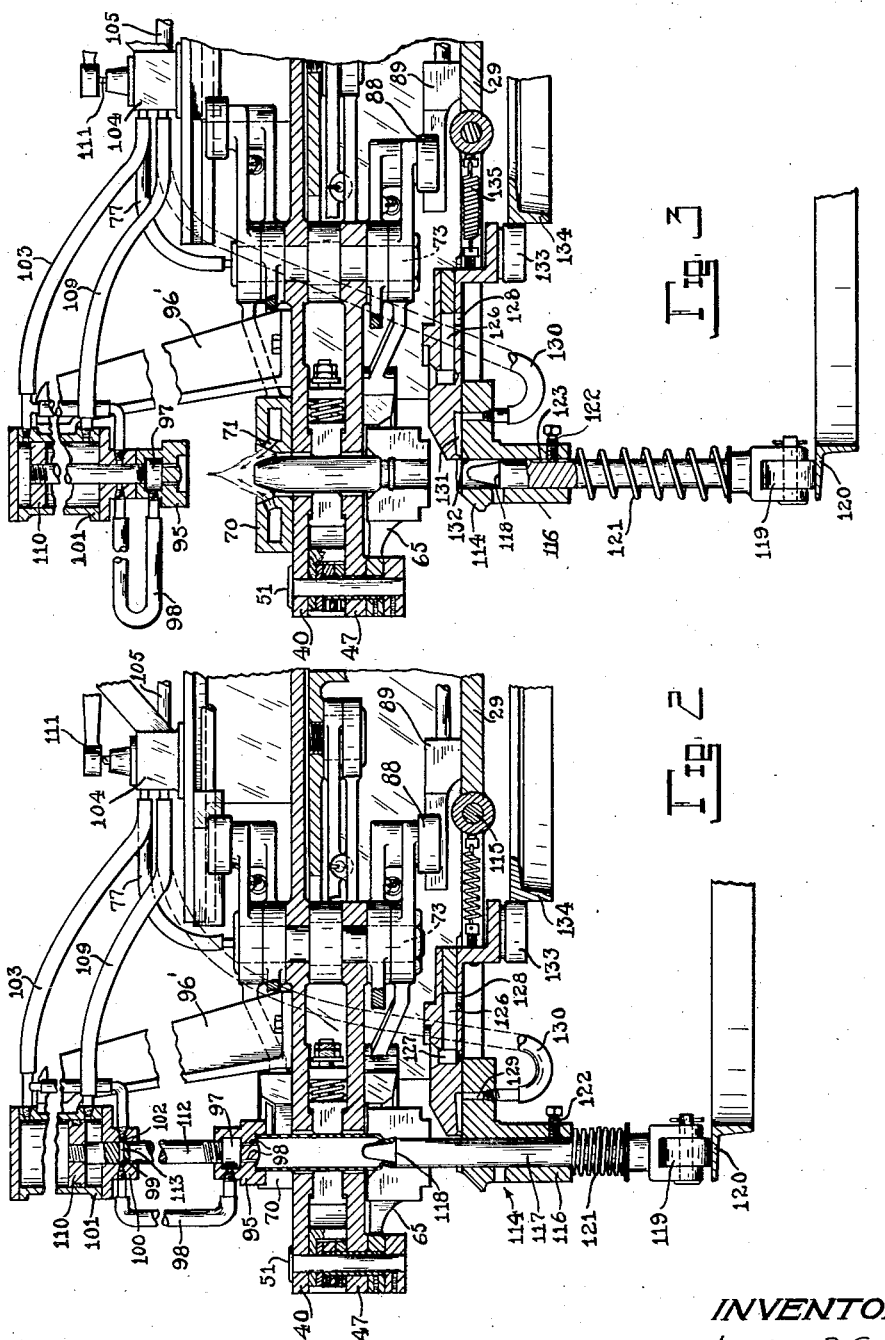

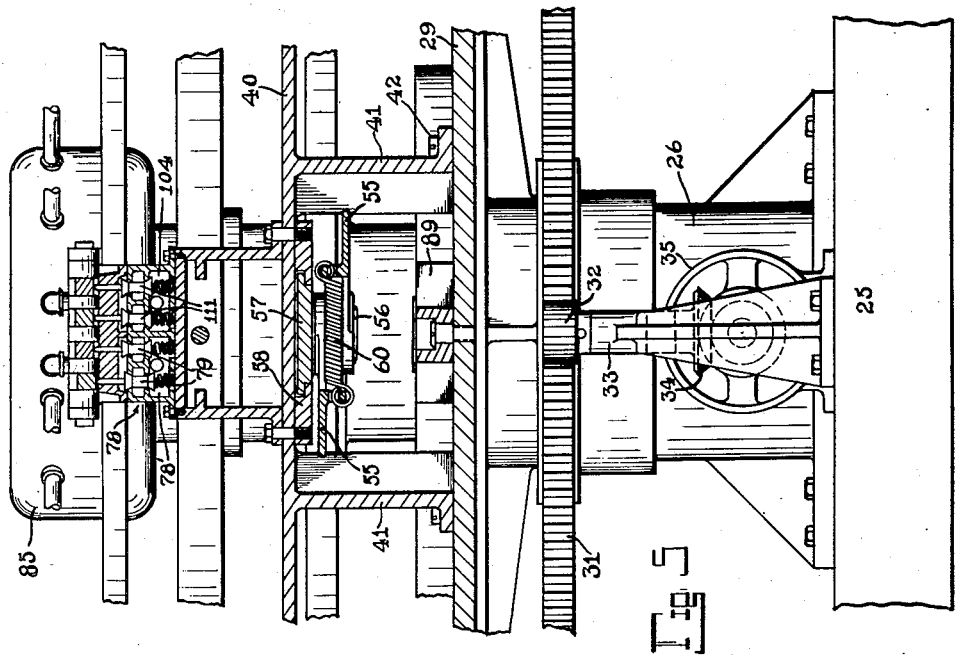
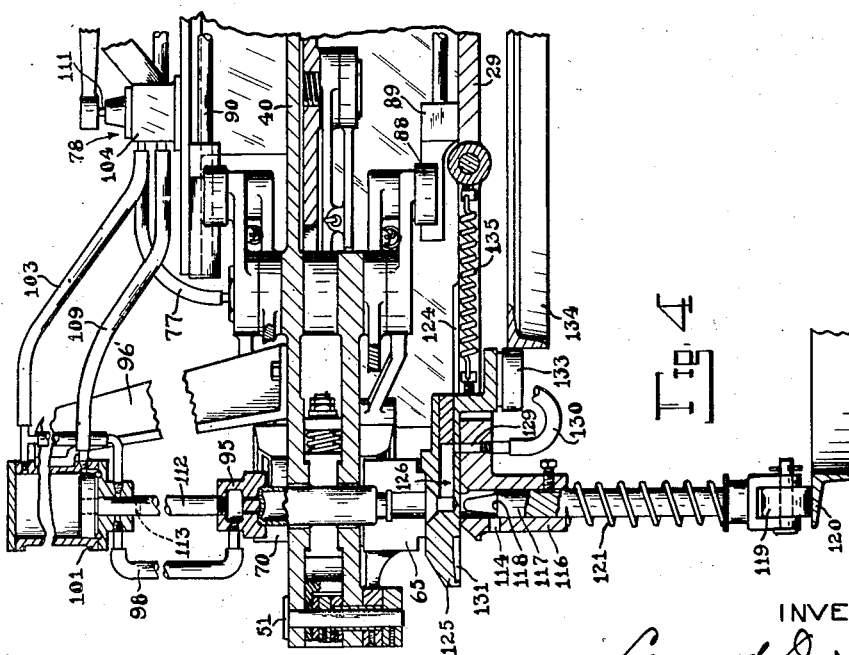

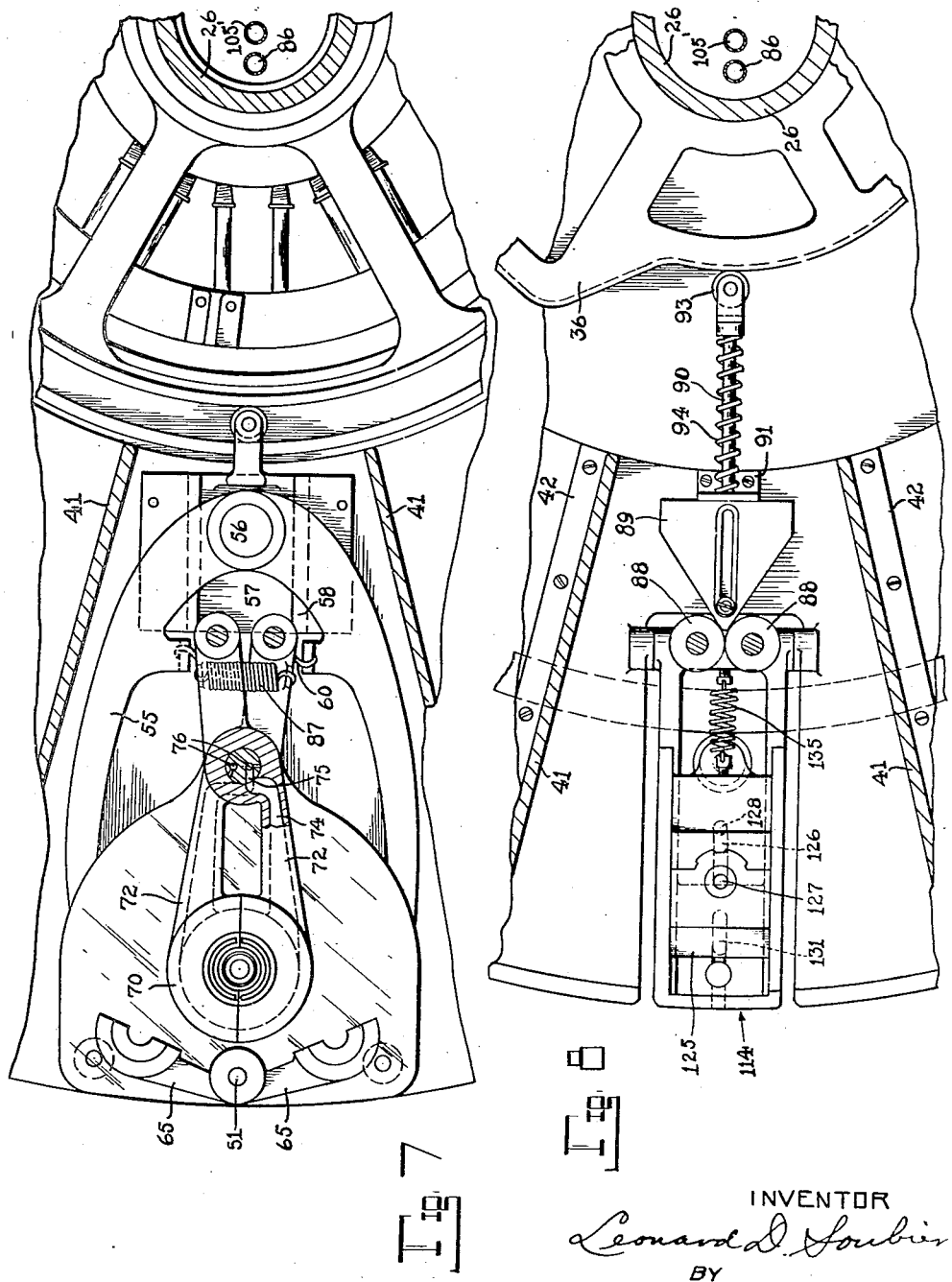

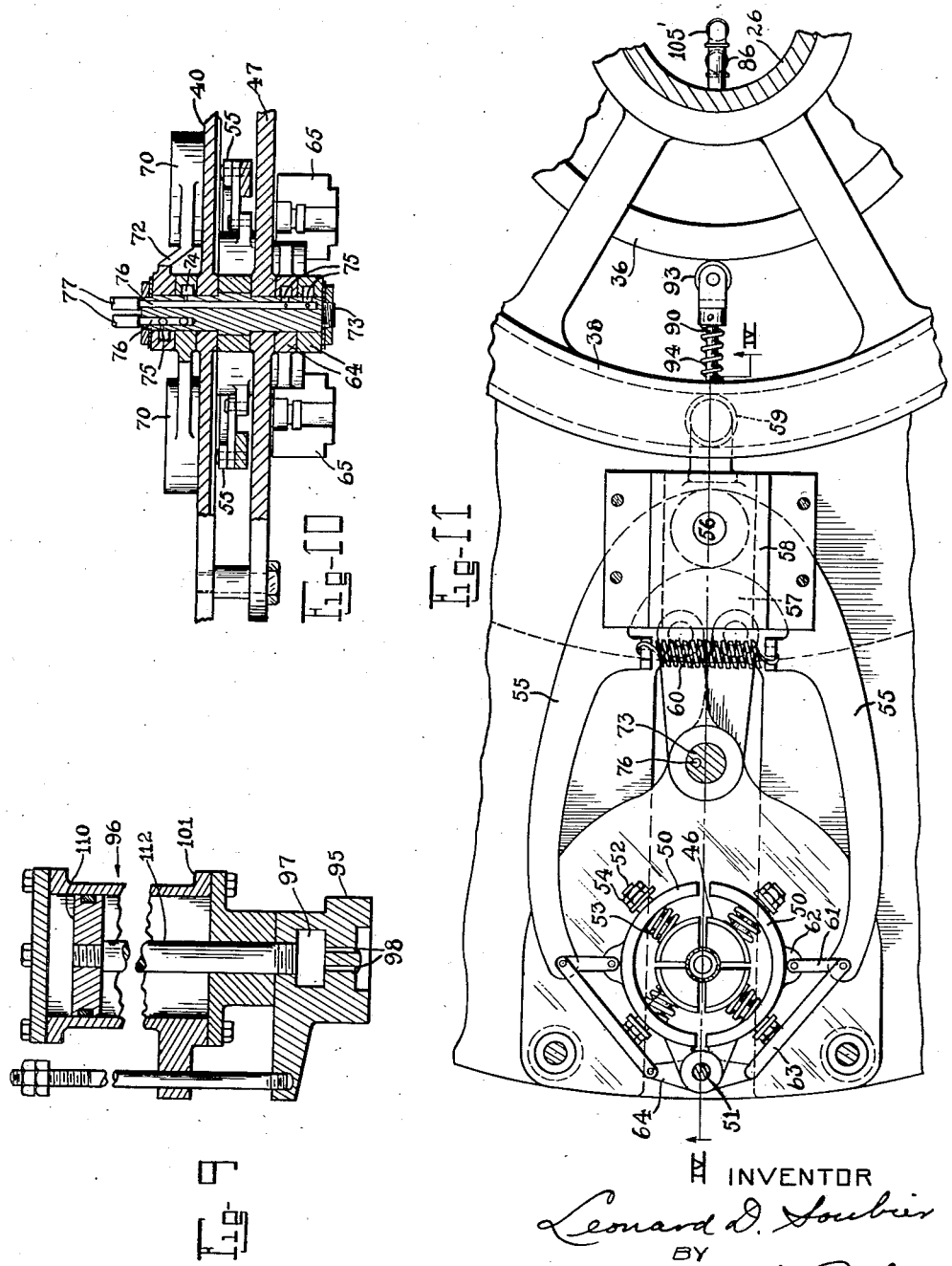

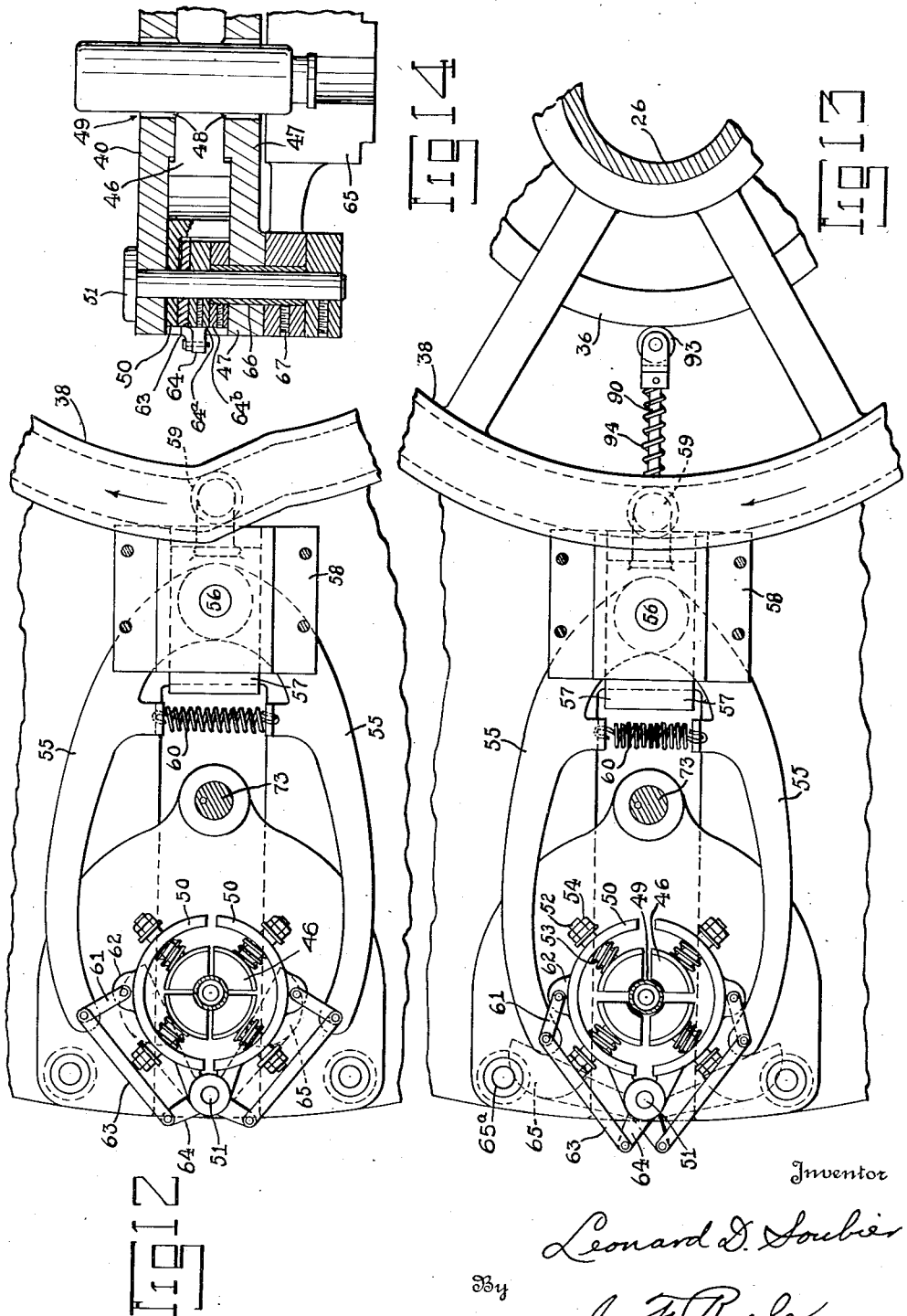

Dec. 29, 1931.  L. D. SOUBIER  1,838,161
GLASSWARE FORMING MACHINE
Filed Feb. 9, 1928    9 Sheets-Sheet 8
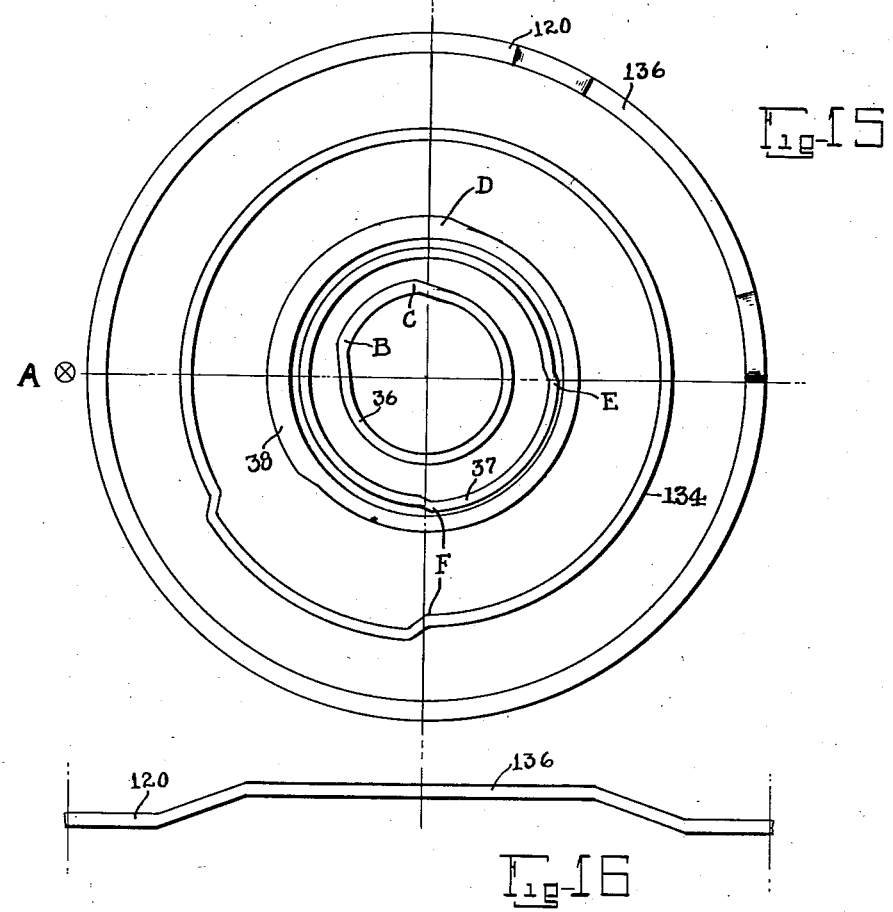
Fig-15
Fig-16
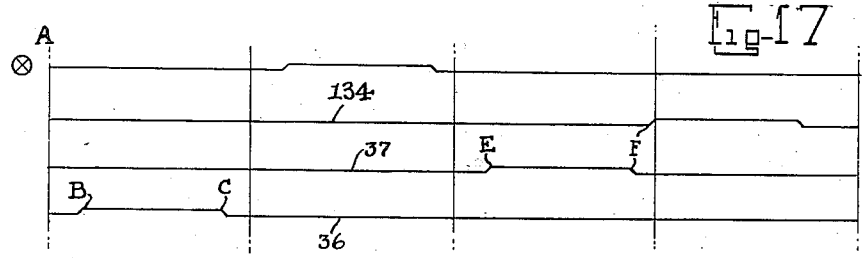
Fig-17
INVENTOR
Leonard D. Soubier
BY
J. F. Rule,
HIS ATTORNEY

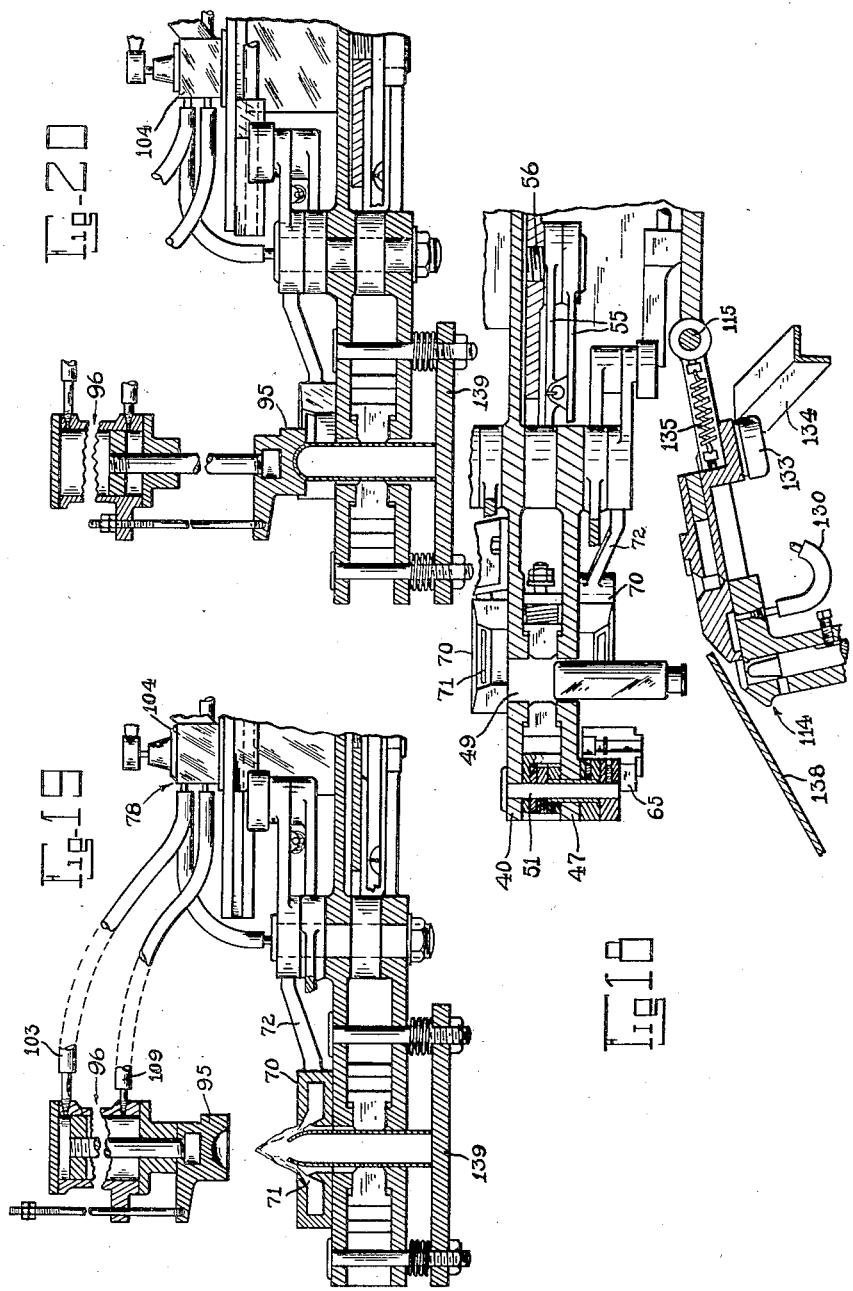

Patented Dec. 29, 1931

1,838,161

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed February 9, 1928. Serial No. 253,020.

The present invention relates to improvements in glassware forming machines, and more particularly to a machine for transforming cold blanks such as, for example, lengths of glass tubing, into bottles, vials and like containers.

An object of the invention is to provide in a machine of the above character, an annular series of holders or chucks which carry lengths of glass tubing or the like through a predetermined closed path wherein portions of the tubing are heat treated and molded to the shape of the articles being produced by the machine. According to the present invention, either or both ends of a length of tubing supported in a holder may be sufficiently heated to permit working and shaping of the glass as may be necessary to form a bottle, vial, or the like container.

Another object is to provide a machine of this character having an annular series of holders and blank treating devices continuously rotatable and operating automatically after the blanks have been placed in the holders to transform the blanks into finished articles and eject the latter from the machine at a predetermined station.

Other objects will be apparent hereinafter.

In the accompanying drawings:

Fig. 1 is a vertical sectional elevation of one unit of the machine showing the manner in which the lower end of a blank is heat treated prior to shaping.

Fig. 2 is a detail sectional view showing shaping means in engagement with the lower end of the blank for shaping said end.

Fig. 3 is a detail sectional view showing the burners closed about the upper end of the blank to soften the glass for final shaping.

Fig. 4 is a view similar to Fig. 3, showing the bottom former in position to shape the bottom of the vial or like container.

Fig. 5 is a vertical transverse sectional view of one of the units taken along the line V—V of Fig. 1.

Fig. 6 is a fragmentary plan view showing several of the annular series of ware forming units.

Fig. 7 is a sectional view taken substantially along the line VII—VII of Fig. 1, and showing a partible burner in position to apply heat to the lower ends of tubes or blanks.

Fig. 8 is a sectional view taken substantially along the line VIII—VIII of Fig. 1.

Fig. 9 is a detail sectional view taken along the line IX—IX of Fig. 1, showing the means for alternately raising and lowering the bottom former and applying blowing air to assist in shaping the neck portions of the articles.

Fig. 10 is a sectional view taken along the line X—X of Fig. 1, showing the means for conducting fuel to the burners.

Fig. 11 is a sectional view taken along the line XI—XI of Fig. 1, showing the chuck or holder of one of the ware forming units supporting a length of tubing.

Fig. 12 is a view similar to Fig. 11, showing the lower neck mold 65 open while the chuck continues to support the blank or length of tubing for shaping.

Fig. 13 is a view similar to Fig. 12, showing the jaws of the chuck expanded to permit removal of a finished article from the holder.

Fig. 14 is a detail vertical sectional view of the blank holder and neck mold, and shows the operating connections between said neck mold and the jaws of the holder or chuck.

Fig. 15 is a diagrammatic plan view showing the series of cams and the approximate relation between the movements of the several elements.

Fig. 16 is a detail elevation of a portion of the plunger cam.

Fig. 17 is a diagrammatic showing of the cams illustrating the relation between the burner and blow head movements.

Fig. 18 is a sectional view showing the relative positions of the elements at the ware ejecting station.

Fig. 19 is a sectional view of another form in which one end only of the blank or length of tubing is softened so that it may be shaped to form a vial.

Fig. 20 is a view similar to Fig. 18, showing the bottom former in position to shape the previously softened end of the blank.

In the accompanying drawings illustrating one embodiment of the invention, the machine is shown as comprising a stationary base 25 supporting a vertical central pillar 26 provided on its exterior with an upwardly facing shoulder 27 extending circumferentially of the column and supporting a blank holder carriage 28. This carriage includes a horizontally disposed base plate 29 formed with a collar 30 which rests upon said upwardly facing shoulder 27, said collar 30 carrying a ring gear 31 running in mesh with a pinion 32 carried by a shaft journalled in vertical bearing 33 and driven through gears 34 from a motor 35, the latter being suitably supported on the base 25.

The stationary column 26 mounts a series of vertically spaced stationary cams, the lower cam 36 adapted to actuate the lower burner operating mechanism, the upper cam 37 actuating the upper burner operating mechanism, and the intermediate stationary cam 38 actuating the blank holder and partible neck mold, all of which will be described in detail hereinafter.

The base plate 29 (Fig. 1) supports an annular plate 40 thereabove, said plates 29 and 40 being held in spaced relation to each other by a series of vertical partition walls or spacers 41 (Fig. 5) which may be integrally formed with and depending from the lower side of the plate 40 and removably secured to the base plate 29 by bolts 42 or the like elements. These partitions 41 form the dividing lines between the units making up the annular series of ware forming groups or heads.

Since the several ware forming units or heads are identical in construction and operation, the following detailed description of the preferred embodiment will be directed to one group or head only.

Each head or unit includes a blank holder or chuck 45 whose function is to support lengths of glass tubing or the like, which comprise the blanks from which ware such as vials and bottles is made. The chuck or holder comprises an annular series of jaw segments 46 (Figs. 1, 12 and 13) disposed between the aforementioned annular plate 40 and a plate 47 interposed between said annular plate 40 and the base plate 29. Vertically aligned openings 48 are formed in the plates 40 and 47 and at all times register with the central opening 49 through the holder. The jaws 46 are yieldably connected to carriers 50 (Fig. 13), mounted to swing toward and from each other on a vertical hinge pin 51. The hinge pin 51 (see Fig. 14) extends downwardly through the plates 40 and 47 and for a short distance below the bottom plate for a purpose to be pointed out hereinafter. Each jaw segment 46 is formed with a short threaded rod 52 slidable through an opening in one of the carriers 50. A coil spring 53 encircles each rod 52 and is interposed between one of the jaw segments and the carrier 50 to normally and yieldingly hold the jaw segments at their innermost limits, the latter being predetermined by the position of the adjusting nuts 54 on the rods and set according to the size of blanks being shaped.

The blank holder or chuck actuating mechanism includes a pair of transversely spaced radially extending arms 55 pivoted at their inner ends to a stud 56 depending from a slide 57 mounted in radially extending guideways 58 (Fig. 1), said slide 57 carrying at its inner end a cam roll 59 running in the path of the stationary cam 38 which, as heretofore stated, predetermines the periods of opening and closing the blank holding jaws. A coil spring 60 interconnects the two arms at a point adjacent the stud 56, tending to yieldingly hold the arms at their innermost limits. The outer ends of these arms 55 are connected through links 61 to ears 62 formed at diametrically opposite points on the two semi-circular carriers 50. These outer extremities of the arms 55 are also connected through relatively long links 63 to ears 64 formed on collars $64^a$ and $64^b$ (Fig. 14) keyed respectively to the hinge pin 51 and a sleeve 66 surrounding an intermediate portion of the hinge pin. A partible neck mold 65 is disposed below the lower plate 47 of the blank holder. One section of the neck mold is pinned to the sleeve 66 and the other neck mold section is rigidly secured to the lower end of the hinge pin 51 by a set screw 67. These neck mold sections 65 are formed to properly shape the neck and shoulder portions of blanks which are supported by the holder or chuck 45 as is apparent by reference to Figs. 2 and 3.

Ordinarily, blanks held in the chuck 45 are formed from glass tubing cut into the desired lengths. These lengths of tubing or blanks are chilled and quite obviously must have portions thereof subjected to heat treatment so that the glass is more or less plastic and may be properly shaped. Accordingly, the present invention embodies suitable burners which at regular intervals and in proper timed relation to other operations, apply intensely hot flames to the upper and lower ends of blanks held in the chucks.

Each ware forming unit is provided with a pair of burners, one above the plate 40 and the other below the plate 47, and each burner comprises a pair of cooperating semi-circular sections 70 formed with arcuate jet orifices 71 inclined to the axis of the blanks held in the jaws whereby the flames impinging on the glass tend to lengthen the blanks as the end portions are heated. The burner supporting arms 72 are pivoted to a vertical hinge pin 73 (Figs. 1, 2 and 3) and formed with conduits 74 through which fuel is supplied to the burners. These conduits 74 register with ports 75 (Figs. 1 and 10) and through these ports communicate with longitudinal passageways 76 through the hinge pin 73. Opening and closing of the burner sections 70 alternately increases and decreases the flow of fuel to the burners by moving the inner ends of the conduits 74 relative to the ports 75. Thus, when the burner sections are moved away from the blanks, merely a pilot flame burns while closing of the burners permits a full head of fuel to flow to the burners. The passageways 76 extend downward from the upper end of the hinge pin 73 (Fig. 10) and one of these passageways terminates at a point in proximity to the upper plate 40 and serves as a conduit for fuel supplied to the upper burner 70. A pair of flexible pipe sections 77 provide communication between the passageways 76 in the hinge pin 73 and a valve box 78 (Figs. 1 and 6), the latter divided into two chambers 78' and 104 (Fig. 5) for the gas and air pressure control valves respectively. A pair of valves 79 (Figs. 5 and 6) operable independently of each other, control the flow of fuel to the burners. A rock arm 80 fulcrumed on a bracket 80' is rocked periodically by a stationary cam 81 to alternately open and close the valve 79 controlling supply of fuel to the upper burner. A rock arm 82 which is actuated by a stationary cam 83, controls the valve 79 which regulates the supply of fuel to the lower burner 70. A supply pipe 84 (Figs. 1 and 6) interconnects the chamber 78' of the valve box 78 and a gas chamber 85 which receives its supply of gas from any suitable source by way of an inlet pipe 86 disposed within the stationary column 26.

Both burners are actuated by substantially identical types of mechanism, each including a pair of inwardly extending fingers 186 integrally formed with the burner supporting arms 72. These fingers are interconnected by coil springs 87 tending to yieldingly hold the burner sections 70 together as shown in Fig. 7.

Rollers 88 (see Figs. 1 and 8) mounted on studs carried by said fingers 186, are engaged at regular intervals by wedge shaped cams 89 slidable radially of the machine and carrying at their inner ends supporting rods 90 slidable through brackets 91 fixed to the base plate 29 and a top plate 92 (Fig. 1). These rods 90 carry cam rolls 93 which ride upon the stationary cams 36 and 37, controlling operation of the lower and upper burners, respectively. Coil springs 94 encircle the rods 90 and normally tend to yieldingly hold the wedge cams 89 at their innermost limit so that the burner sections are in closed position as shown in Fig. 7.

A bottom former 95 (Figs. 1 and 9) whose function is to properly shape the bottoms of vials, bottles and the like containers is axially aligned with the blank holder or chuck 45 and is lowered at regular intervals by an air motor 96 which is mounted on a bracket 96'. The former 95 (Figs. 1 and 2) is provided with an air chamber 97 and ports 98 opening to the atmosphere through the lower side and therefore serves as a combined blowing and shaping head as will appear more fully hereinafter. A flexible pipe section 98 interconnects the chamber 97 and a port 99 in a depending guide sleeve 100 on the lower end of the air motor cylinder 101. A port 102 is formed in said sleeve diametrically opposite the other port 99 and is connected to an air pressure supply pipe 103 which opens into the upper end of the cylinder 101. This pipe 103 extends radially inward for connection to the air pressure chamber 104 of the valve box 78, from which chamber a pipe 105 leads inwardly to an air pressure supply chamber 106, the latter connected to a supply pipe 105'. Rock arms 107 (Fig. 6) control opening and closing of the air pressure control valves 111 and are rocked at regular intervals by stationary cams 108 and 108'. A flexible pipe 109 interconnects the air chamber 104 of the valve box 78 and the lower end of the motor cylinder 101 below the piston 110. With opening of one of the valves 111 in the air chamber 104 of the valve box 78, air pressure is supplied through the pipe 103 to the motor 96 above the piston 110 to thereby lower the bottom former 95 which is connected to the piston by a piston rod 112. This piston rod 112 is formed with a transverse passageway 113, which, when the former is at its lowermost limit, provides communication between the two diametrically opposed ports 99 and 102 so that air pressure is supplied to the chamber 97 in said former and thence to the interior of the blank by way of the downwardly opening ports 98.

Arranged below each blank holder is a mechanism designed to cooperate with the neck mold in shaping the neck and finish portions of the ware and to apply air pressure internally of the blank during sealing of the bottom end thereof. This mechanism includes an elongated frame 114 hinged to the main base plate 29 by a transverse hinge pin 115 so that said frame is capable of vertical swinging movement toward and from the blank holder. A vertical bearing 116 formed at the outer end of the frame 114 carries a plunger 117. This plunger is formed with a tip 118 at its upper end to cooperate with the neck mold in properly shaping the finish and neck portions of articles being produced by the machine. The lower end of the plunger rod carries a roll 119 riding upon a serpentine track 120 which is shaped to effect alternate raising and lowering of the plunger at regular intervals. A coil spring 121 encircling the plunger rod between the roll 119 and the bearing 116 operates to insure proper engagement between said roll and the track. A pin 122 (see Fig. 3) or screw projects through an opening in the bearing 116 into a keyway 123 extending longitudinally of the plunger rod to thereby prevent rotation of said rod in the bearing.

The frame 114 is formed with a pair of longitudinal guideways 124 carrying the blow slide 125, the latter movable lengthwise of said frame to cause periodic application of air pressure upwardly into blanks in the holder. This blow slide (Figs. 2, 3 and 4) is formed with a chamber 126 having an upwardly opening port 127 at one end and a downwardly opening inlet port 128 at its other end. At regular intervals, the slide is moved so that the upwardly opening port 127 is brought into register with the neck mold, such movement of the slide also bringing the inlet port 128 into register with a port 129 in the frame 114. This port 129 forms with a flexible pipe 130, means to conduct air pressure to the chamber 126 from the valve box 104 which, as previously stated, is connected to an air pressure chamber 106 by means of a pipe 105. When the blow slide 125 occupies its innermost position, a port 131 (Fig. 3) cooperating with a slot 132 in the upper end of the bearing sleeve 116 permits the application of cooling air to the plunger tip.

The blow slide 125 carries a cam roll 133 at its inner end for contact with a stationary circular cam 134. A coil spring 135 interconnects the inner end of the blow slide and the vertically swinging frame which carries the slide and operates to insure proper engagement between cam and cam roll as well as return of the blow slide to its innermost limit at proper intervals.

In Figs. 15, 16 and 17, the cams and serpentine track are illustrated to more or less diagrammatically bring out the relation between the operating periods of the several elements. Starting at station "A", at which a length of tubing or a blank is placed in the holder, rotation of the blank holder carriage in a clockwise direction brings a unit to station "B" on the lower burner cam 36, this cam operating to close the lower burners 70 about the lower end of the blank projecting below the holder. The intense flame applied to this portion of the blank softens the glass, and due to downward inclination of the flame, there is a tendency for it to lengthen the blank. At station "C", the lower burner sections separate so that when the unit arrives at station "D" (Fig. 15) on the cam 38 controlling movement of the blank holding jaws and neck mold, the later will be swung into engagement with the softened lower end of the blank. Immediately following closing of the neck mold 65 as stated, the serpentine track 120 which is provided with a raised portion 136, operates to raise the plunger 117 to a position for cooperation with the neck mold 65 (Fig. 2) in shaping the finish and neck portions of the blank. While the neck mold and plunger are engaged with the lower end of the blank as shown in Fig. 2, the bottom former is lowered to close the upper open end of the blank and permit application of air pressure internally thereof to expand the lower end to the shape of the neck mold cavity. Following completion of this neck shaping operation, the plunger 117 is lowered and the bottom former 95 raised, the resultant relative positions being illustrated in Fig. 3. At station "E" on the upper burner cam 37, the upper burner 70 is closed about the upper end of the blank as shown in Fig. 3 to heat the upper end of the blank so that it may be properly shaped. This flame is inclined upwardly so that it tends to elongate the blank. Upon reaching station "F" on the cam 37 and the blow slide cam 134, the upper burner opens and the blow slide 125 moves radially outward to cooperate with the neck mold 65 in forming a conduit for air pressure which is applied upwardly into the blank. Just previous to this application of air pressure, the bottom former 95 is lowered, by means heretofore described, to the position shown in Fig. 4, so that the softened glass is given the shape of the bottom of the ware being produced by the machine. After this operation, the bottom former 95 is raised, the blow slide 125 is moved radially inward, and the neck mold 65 is opened, such movements being immediately followed by downward swinging of the blow slide frame 114 to avoid interfering with discharge of the finished article from the blank holder. The operation of the mechanism for opening the neck mold 65 and the blank holder or chuck 45 is as follows:

Referring to Figs. 11, 12 and 13, the blank holder is shown in Fig. 11 in its closed position with the jaws 46 gripping the blank. The neck mold 65 is also closed. As the cam roll 59 runs onto the operative section of the cam 38, as shown in Fig. 12, the slide 57 is moved radially outward carrying with it the arms 55. These arms exert an outward thrust on the links 63 which, as before noted, are pivoted to the ears 64 on the neck mold sections. Said sections are, therefore, swung apart as shown by dotted lines in Fig. 12. It will be noted that the spring 60 which maintains an inward tension or pull on the arms 55, holds the jaws 46 in gripping engagement with the blank during this opening movement of the neck mold. As this movement continues, the neck mold sections when they reach their fully opened position (Fig. 13) are arrested by stops 65ᵃ. After this, the movement of the slide 57 and arms 55 is continued for a short distance and during this continued movement the links 63 are compelled to swing about their points of pivotal connection with the ears 63 so that they operate through the short links 61 to swing the carriers 50 about their pivot 51, thus separating the jaws 46 sufficiently to release the blank so that the latter may drop by gravity from the holder to any suitable ware handling device 138, as shown in Fig. 18.

In another form of the invention shown in Figs. 19 and 20, the lower burner, neck mold, and neck forming plunger have been eliminated and in their places a blank supporting plate 139 has been substituted. This form of the invention is identical with that previously described, with the exceptions just noted, and is employed to seal one end only of the blanks. The bottom former 95 in this form is shown with a hemi-spherical cavity such as might be used in shaping the bottoms of test tubes.

Modifications may be resorted to within the spirit and scope of the appended claims.

What I claim is:

1. In a glassware forming machine, the combination of an annular series of blank holders rotatable about a vertical axis, partible neck molds individual to the holders and positioned below and in vertical axial alignment therewith, cam mechanism for alternately opening and closing the blank holders and neck molds, means for heating, softening and shaping the upper ends of the blanks while the latter are supported in and projecting above the holders, and means cooperating with the neck molds for heating, softening and shaping the lower ends of the blanks.

2. In a glassware forming machine, the combination of a stationary central pillar, a frame rotatable about the pillar, a blank holder on said frame adapted to support a blank in an upright position, means individual to the holder to soften opposite ends of the blank, means individual to the holder to shape the softened portions of said blank, and automatic means actuating the holder at predetermined time intervals to eject formed articles from said holder.

3. In a glassware forming machine, the combination of a stationary central pillar, a frame rotatable about the pillar, a blank holder on said frame adapted to support an open ended tubular blank in an upright position, means on said frame for heating and softening the upper open end of a blank in the holder, an air motor supported above said holder, a bottom former movable at regular intervals by said motor to shape said softened upper end of the blank while in said holder, means to apply air pressure internally of the blank through said open upper end while said former is engaged with the blank, means to shape the softened lower end of said blank, and means to open said holder at regular intervals to discharge formed articles therefrom.

4. A glassware forming machine, comprising in combination, a blank holder adapted to support blanks in an upright position with their ends projecting above and below said holder, means individual to the holder and closeable one at a time about end portions of the blanks to soften said portions, a bottom former movable at regular intervals into contact with a softened portion to shape the latter, a partible neck mold for shaping another portion of the blank, mechanism for alternately opening and closing the neck mold, and means actuated by said mechanism after the neck mold has opened to actuate the holder for releasing the shaped blank therefrom.

5. In a glassware forming machine, a blank holder adapted to support blanks in an upright position with their ends projecting above and below said holder, means to shape the projected ends of the blanks, said means including a partible neck mold, and an operating device connected to said neck mold and holder and operable during a portion of its movement in one direction to open the neck mold and during the remaining portion of said movement operable to actuate said holder to release a blank therefrom.

6. In a glassware forming machine, a blank holder rotatable about a vertical axis at one side of the holder, said holder adapted to support blanks in an upright position, means to shape the upper and lower ends of blanks supported in the holder, said means including a partible neck mold and plunger cooperating with each other to shape one end of the blanks, a bottom former movable exially of the supported blanks for shaping engagement with the other end of the blanks, and an operating device movable back and forth and having operating connections with the neck mold and blank holder, said device operable during a portion of its movement in one direction to open the neck mold without actuating the blank holder and operable during its continued movement in said direction to actuate the blank holder and release a formed article therefrom.

7. In a glassware forming machine, an annular series of blank holders rotatable about a vertical axis and adapted to support blanks in an upright position, each holder including a pair of carriers pivoted to a vertical hinge pin, an annular series of jaw segments, yieldable connection between said segments and the carriers whereby said jaws yieldingly engage blanks supported in the holder, means to shape the end portions of blanks supported in said holder, said shaping means including a neck mold having separable sections, and an operating device movable back and forth and having operating connections with the neck mold sections and blank holder, said device operable during a portion of its movement in one direction to separate the neck mold sections while the blank holder retains its blank holding position and operable during its continued movement in said direction to expand the blank holder and release the blank therefrom.

8. In a machine for heating and shaping a glass blank, the combination of a blank holder constructed to hold a blank in an upright position with the ends thereof protruding above and below the holder, a neck mold positioned below the holder and comprising horizontally separable sections in vertical axial alignment with the holder and blank when the neck mold is closed, cam mechanism for alternately opening and closing the blank holder and neck mold, means for heating, softening and shaping the upper end of the blank while the latter is supported in and projecting above the holder, means cooperating with the neck mold for heating, softening and shaping the lower end portion of the blank prior to the closing of the neck mold, and means for supplying air under pressure through one end of the blank during said shaping of the opposite end of the blank.

9. In a machine for heating and reshaping blanks of glass tubing, the combination of a blank holder, means for actuating the blank holder and causing it to grip a blank and hold it in an upright position, burners respectively movable into and out of operative positions adjacent the ends of the blank and operable to heat and soften the end portions of the blank, shaping devices, means for moving said shaping devices into operative position when the burners are withdrawn and causing said shaping devices to shape said softened end portions, means for supplying air under pressure to the interior of the blank during the shaping thereof, and automatic means for actuating the holder to release and eject the formed articles.

10. In a machine for heating and reshaping blanks of glass tubing, the combination of a blank holder, means for causing said holder to grip and support a blank in upright position, heating means operable to heat and soften the upper end of the blank while supported in the holder, an air motor supported above the holder, a bottom former operated by said motor to shape the softened upper end of the blank in the holder, means for applying air pressure internally of the blank while said bottom former is engaged with the blank, means to heat and soften the lower end of the blank, means to shape said softened lower end, and means to open said holder and discharge the formed article therefrom.

11. In a machine for heating and shaping glass blanks, a blank holder, means for causing said holder to engage a blank and hold it in an upright position, said holder including a pair of carriers pivoted to swing about a vertical axis, an annular series of jaw segments and means forming a yieldable connection between said segments and the carriers, whereby said segments yieldingly engage a blank supported in the holder, means to shape the end portions of a blank supported in the holder, said shaping means including a partible neck mold, and an operating device movable back and forth and having operating connections with the neck mold and said holder, said device operable during a portion of its movement in one direction to open the neck mold without opening said holder, and operable during its continued movement in said direction to actuate said holder and release the blank therefrom.

12. In a machine for heating and reshaping blanks formed of glass tubing, the combination of a holder for a tubular blank, a burner comprising separable sections surrounding an end portion of a blank supported in the holder, said burner formed with an annular series of openings arranged to surround the blank adjacent one end thereof and inclined toward said end to provide an annular tapered flame surrounding the blank for heating the latter and simultaneously applying a pressure tending to taper the softened end portion of the blank, means for withdrawing the burner from the blank, a forming device having a concave shaping surface, and means for moving said device in a direction lengthwise of the blank and bringing said shaping surface into engagement with said heated end of the blank after the burner has been withdrawn, said shaping surface being shaped to close said heated end of the blank.

13. In a machine for heating and reshaping blanks formed of glass tubing, the combination of a holder for a tubular blank, a burner comprising separable sections surrounding an end portion of a blank supported in the holder, said burner formed with an annular series of openings arranged to surround the blank adjacent one end thereof and inclined toward said end to provide an annular tapered flame surrounding the blank for heating the latter and simultaneously applying a pressure tending to taper the softened end portion of the blank, means for withdrawing the burner from the blank, a forming device having a concave shaping surface, means for moving said device in a direction lengthwise of the blank and bringing said shaping surface into engagement with said heated end of the blank after the burner has been withdrawn, said shaping surface being shaped to close said heated end of the blank, and means operable while the forming device is in engagement with the blank to supply air under pressure through the opposite end of the blank and thereby assist in shaping the heated end of the blank.

14. In a machine for heating and reshaping blanks of glass tubing, the combination of a holder for the blank, means for heating and softening one end of the blank, a shaping device, means for moving it into engagement with said softened end of the blank, a combined blowing and shaping head, means for moving it into engagement with the other end of the blank and supplying air under pressure to the interior of the blank to assist in shaping said softened end, means for withdrawing said head, means for heating and softening the end of the blank with which the head has been engaged, and means for then moving said head again into engagement with and shaping the blank.

15. In a machine for heating and reshaping blanks of glass tubing, the combination of a holder for the blank, means for heating and softening one end of the blank, a shaping device, means for moving it into engagement with said softened end of the blank, a combined blowing and shaping head, means for moving it into engagement with the other end of the blank and supplying air under pressure to the interior of the blank to assist in shaping said softened end, means for withdrawing said head, means for heating and softening the end of the blank with which the head has been engaged, means for then moving said head again into engagement with and shaping the blank, and means to supply air under pressure to the interior of the blank while the latter is being shaped by said head.

16. In a machine for heating and shaping blanks of glass tubing, the combination of a holder in which a blank is supported, a neck mold comprising separable sections mounted to swing about a pivot at one side of the blank, a burner comprising separable sections mounted to swing about a pivot at the opposite side of the blank, and means for actuating said burner and neck mold and moving them alternately into position to surround the blank.

17. The combination of a traveling carriage, a blank holder thereon operable to support a blank tube in upright position, a burner arranged to heat and soften the lower end of the blank, a neck mold movable into position to surround said softened end, a vertically disposed plunger below the blank, a stationary cam operable to move the plunger vertically and cause it to enter the lower end of the blank, means for heating and softening the upper end of the blank, a shaping head, means for moving said head into engagement with and causing it to shape said upper end of the blank, means for withdrawing said plunger, a blow slide, means for moving the blow slide into position beneath the neck mold, and means for supplying air pressure through said slide and neck mold to the interior of the blank while the latter is being shaped by said head.

18. In a machine for heating and shaping glass blanks, the combination with a carriage rotatable about a vertical axis, of spaced parallel horizontal plates in fixed relation to and forming part of said carriage, said plates having vertically aligned openings therethrough, a blank holding device interposed between said plates and operable to hold a blank in a position in which it extends through said openings and protrudes at its opposite ends beyond said plates, and burners mounted on the carriage exteriorly of said plates and operable to heat and soften said protruding ends of the blank.

19. In a machine for heating and shaping glass blanks, the combination of a carriage rotatable about a vertical axis, spaced parallel plates in fixed relation to and forming part of said carriage, said plates having vertically aligned openings therethrough, a blank holding device interposed between said plates and operable to hold a blank in a position in which it extends through said openings and protrudes at its opposite ends beyond said plates, burners mounted on the carriage exteriorly of said plates and operable to heat and soften said protruding ends of the blank, said plates and holder being horizontally disposed whereby the blank is held in upright position, and automatic means for actuating the holder to release the blank and permit it to drop through said openings.

20. The method of forming a section of glass tubing into a hollow container which comprises the following steps: supporting the tubing intermediate its ends, applying a localized flame to one end of the tubing and thereby softening it, and applying air pressure through the opposite open end of the tubing and thereby causing said softened end to take a finished shape between molding walls arranged interiorly and exteriorly of said end.

21. The method of forming a section of glass tubing into a hollow container which comprises the following steps: supporting the tubing intermediate its ends, applying a localized flame to one end of the tubing and thereby softening it, applying air pressure through the opposite open end of the tubing and thereby causing said softened end to take a finished shape between molding walls arranged interiorly and exteriorly of said end, applying a localized flames to the unfinished end of the tubing and thereby softening it, closing said unfinished end by a mold applied to the exterior thereof, and simultaneously applying air pressure interiorly of the tubing.

Signed at Toledo, in the county of Lucas and State of Ohio, this 7th day of February, 1928.

LEONARD D. SOUBIER.